May 3, 1966  F. B. RENEGAR  3,249,016
DETACHABLE SPINDLE SUPPORTING ASSEMBLY FOR DIE SINKING APPARATUS
Filed Aug. 11, 1964  2 Sheets-Sheet 1

INVENTOR.
FRANK B. RENEGAR
BY
ATTORNEY

May 3, 1966 F. B. RENEGAR 3,249,016
DETACHABLE SPINDLE SUPPORTING ASSEMBLY FOR DIE SINKING APPARATUS
Filed Aug. 11, 1964 2 Sheets-Sheet 2

INVENTOR.
FRANK B. RENEGAR
BY
ATTORNEY

United States Patent Office 3,249,016
Patented May 3, 1966

3,249,016
DETACHABLE SPINDLE SUPPORTING ASSEMBLY FOR DIE SINKING APPARATUS
Frank B. Renegar, Greensburg, Pa., assignor to Overmyer Mould Company of Pennsylvania, Greensburg, Pa., a corporation of Pennsylvania
Filed Aug. 11, 1964, Ser. No. 388,881
6 Claims. (Cl. 90—13.1)

This invention relates to die sinking apparatus, and more particularly to a detachable spindle supporting assembly for use in conjunction with said die sinking apparatus.

Apparatus is presently available for manufacturing both positive and negative die molds. These apparatus are commonly known as die sinking machines. A conventional die sinking machine includes a horizontal slide plate which is supported for movement in three-dimensional space. That is to say, the slide plate may be moved simultaneously in two mutually perpendicular directions to cover an infinity of points in a given plane while also being movable in a vertical direction. Supported on the slide plate is a tracing stylus and a spindle which rotatably supports a cutter. The spindle and the tracing stylus are disposed in spaced-apart substantially parallel relationship. Disposed beneath the slide plate are two clamping tables each which is individually adjustable relative to the slide plate. One clamping table is disposed beneath the tracing stylus while the other clamping table is disposed beneath the cutter, the arrangement being such that a master mold may be clamped to one of the tables directly opposite to the tracing stylus while a workpiece may be clamped to the other clamping table directly opposite the cutter. The position of the workpiece and the master mold relative to one another is such that upon lowering of the slide plate the cutter and the tracing stylus will contact corresponding points on the surfaces of the workpiece and the master mold. Consequently, movement of the tracing stylus along the contours of the master mold will cause the cutter to machine contours in the surface of the workpiece which are identical to the contours of the master mold. Drive means is, of course, provided for rotating the cutter at a relatively high rate of speed.

As is shown, molds are produced for use in the manufacture of, for example, glassware. These molds normally are manufactured in two halves. The mold halves are subsequently clamped together to define a cavity having the desired shape and/or design of the glassware to be produced. In the above-described apparatus, each of the mold halves must be machined separately. That is to say, a mold blank is secured to the clamping table in a predetermined orientation with respect to the master mold. The mold blank is then machined to produce one-half of the complete mold. Thereafter, a second mold blank is secured to the clamping table in substantially exactly the same position as the previously-machined mold half. This mold half is then machined to produce the other mold half of the completed mold.

Since each mold half is individually machined, it is absolutely necessary that the mold cavity machined therein be symmetrical about a centerline of the mold blank. This should be evident, since, each mold half is rotated about the centerline to bring the cavity halves into opposition prior to clamping the mold halves together. If the cavity half of each mold half is symmetrical about the mold blank centerline, the resulting cavity will have a surface which is continuous at the juncture of the two mold halves. If, however, one cavity half is offset from the mold blank centerline, the resulting cavity will have a discontinuous surface, i.e., there will be a break in the continuity of the cavity surface at the line of juncture of the two mold halves. It should be evident that the cavity halves of the two mold halves may be offset from the mold blank centerline by the same amount and on the same side of the mold blank centerline without effecting the surface continuity of the resulting cavity.

Consequently, in the above-described apparatus, it is very difficult to produce a pair of mold halves which when clamped together will define a cavity having a continuous surface. This should be evident since it is difficult to place each mold half in exactly the same position on the clamping table each and every time.

Accordingly, it is the primary object of the present invention to provide apparatus for producing mold halves wherein the mold cavities are disposed in substantially identical positions with respect to the centerline of the two mold halves.

Another object of the present invention is to provide apparatus for producing two or more mold halves simultaneously which may be subsequently clamped together to define a cavity having a continuous surface.

A further object of the present invention is to provide a spindle supporting assembly usable with conventional die sinking apparatus for substantially doubling the production rate of said apparatus.

A still further object of the present invention is to provide a spindle supporting assembly usable with conventional die sinking apparatus, which assembly is detachable from the apparatus whereby the apparatus may be used with or without the spindle supporting assembly.

Another object of the present invention is to provide a detachable spindle supporting assembly which is usable with conventional die sinking apparatus for substantially doubling the production rate of said apparatus without effecting its machining accuracy.

In accordance with the present invention, there is provided a detachable spindle supporting assembly having a bracket which is adapted to be bolted to the aforementioned slide plate in a predetermined position relative to the rotatable cutter carried on the slide plate. The bracket includes an outboard end to which is secured a carrier member which also supports a spindle including a second cutter. Means is provided for adjusting the position of the carrier member relative to the slide plate whereby the second cutter may be positioned at exactly the same elevation above the clamping table as is the rotatable cutter carried on the slide plate. Secondary drive means also is provided for interconnecting the second cutter with the main drive of the apparatus whereby the first-mentioned cutter and the second cutter are driven simultaneously. In the present detachable spindle support ing assembly the second cutter preferably is driven at a higher rate of speed than the first-mentioned cutter. This is a preferred arrangement in order to eliminate the chatter normally associated with a second cutter.

As will be more fully described later in the specification, a first mold half is secured to the clamping table directly beneath the first-mentioned cutter. The first mold half is oriented with respect to the master mold whereby upon lowering of the slide plate the tracing stylus and the first-mentioned cutter will contact coresponding points on the surfaces of the master mold and the first-mentioned cutter, respectively. Thereafter, a second mold half is secured to the clamping table directly beneath the second cutter. The two mold halves are spaced apart by a distance equal to the distance between the centerlines of the first-mentioned cutter and the second cutter. That is to say, corresponding points on the two mold halves will be spaced apart by a distance equal to the distance between the centers of the first-mentioned cutter and the second cutter.

Hence, in the present invention the spindle supporting assembly may be quickly and easily attached and detached from the above-mentioned slide plate whereby the die sinking apparatus may be used with or without the present spindle supporting assembly. However, when the present spindle supporting assembly is used in conjunction with the die sinking apparatus, the production rate of said apparatus is substantially doubled. Furthermore, two mold halves may be produced simultaneously which when clamped together define a cavity having a surface which is continuous.

The above and other objects and advantages of the present invention will become apparent from the following detailed description by reference to the accompanying drawings, in which:

FIG. 4 is a front view of the apparatus illustrated in FIG. 3; and

FIG. 5 is a fragmentary side view illustrating an adjustment means employed for elevating and lowering the cutter of the present spindle supporting assembly.

Figure 1:
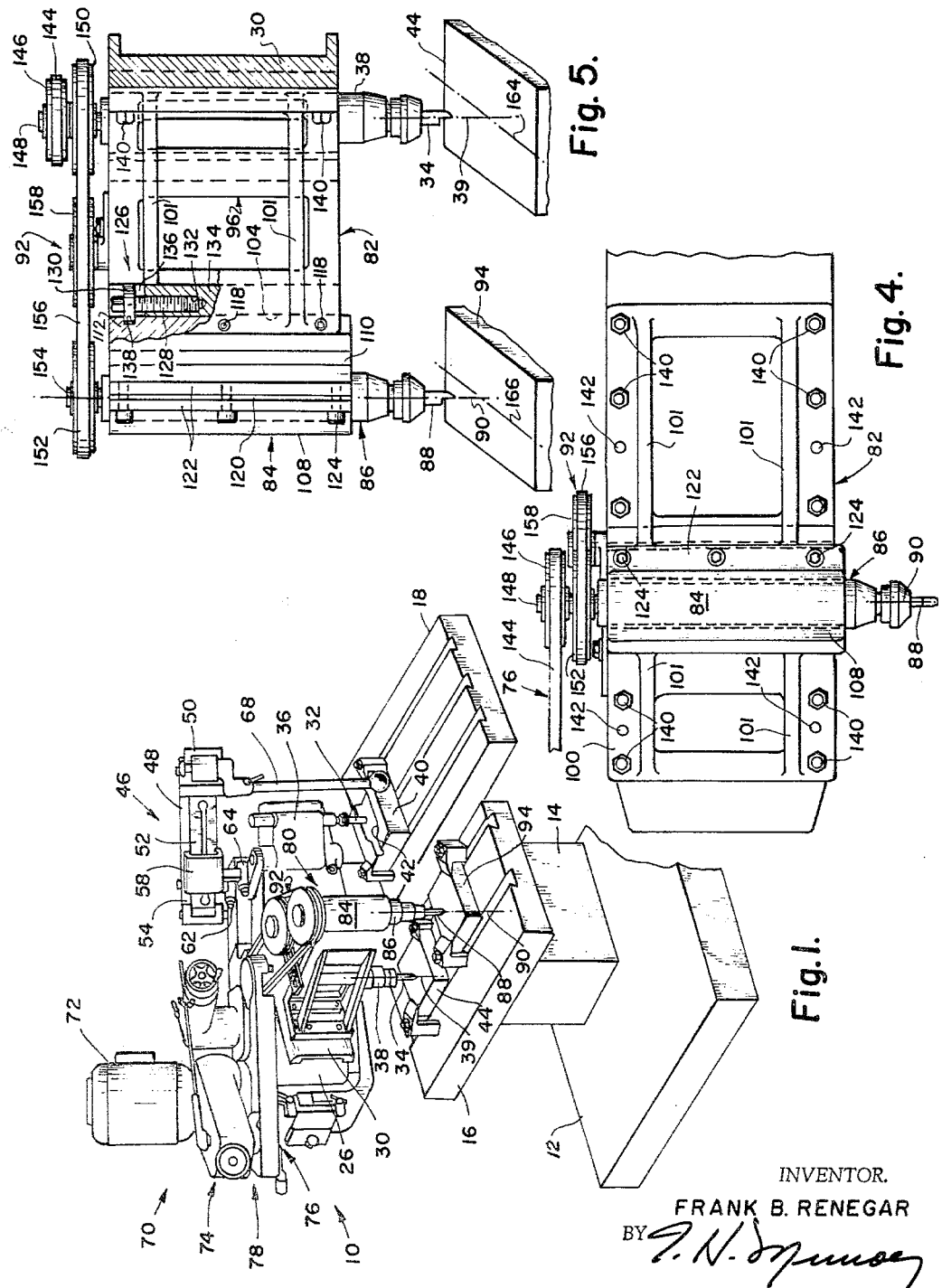
FIGURE 1 is an isometric view of a conventional die sinking apparatus which employs the spindle supporting assembly of the present invention.
Figure 2:
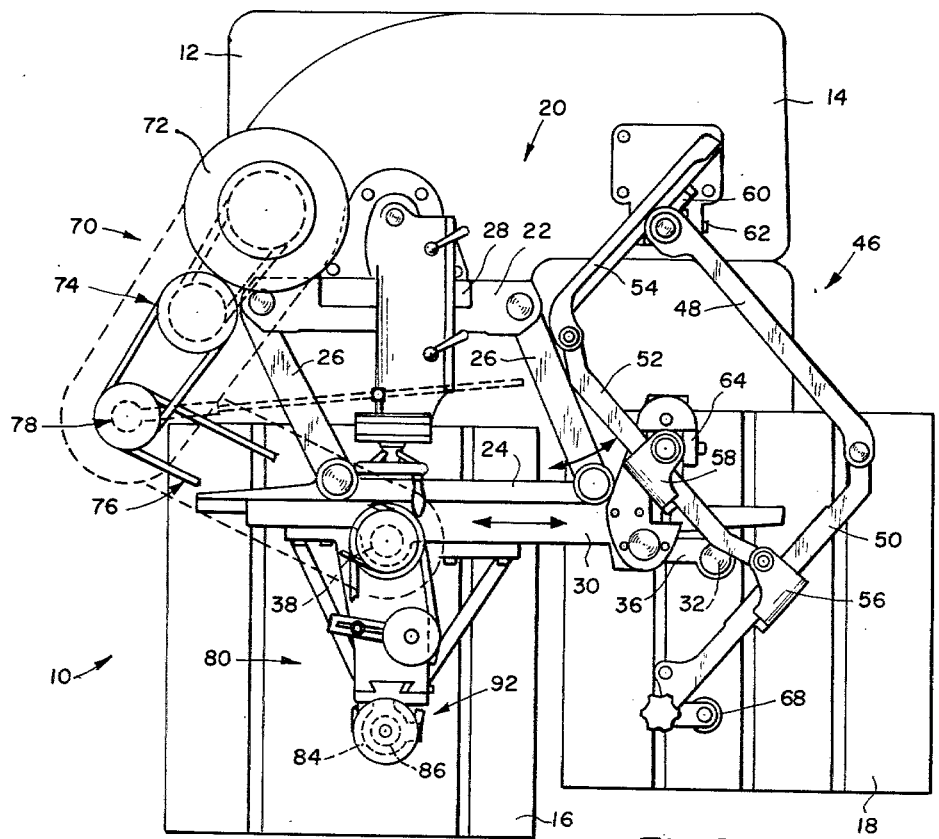
FIG. 2 is a plan view further illustrating the die sinking apparatus of FIG. 1.

Reference is now directed to FIGS. 1 and 2, wherein there is illustrated a conventional die sinking apparatus generally indicated by the numeral 10. As can be seen, the die sinking apparatus 10 includes a base 12 above which projects a supporting column 14. Projecting horizontally from and individually connected to the supporting column 14 are two clamping tables 16 and 18. Suitable controls (not shown) normally are provided for adjusting the position of the clamping tables 16, 18.

As can best be seen in FIG. 2, a parallel guiding mechanism 20 is provided which comprises a back plate 22 and a front plate 24 which have their corresponding ends pivotally connected to connecting arms 26, the arrangement being such that the front plate 24 is maintained parallel to the back plate 22 at all times during its movement. The back plate 22 is connected to the supporting column 14 by means of a vertical guideway 28 whereby the entire parallel guiding mechanism 20 may be raised or lowered. A slide plate 30 is connected to the front plate 24 for sliding movement relative thereto. As indicated by the arrows in FIG. 2, the slide plate 30 is slideable to the right or to the left of FIG. 2. The slide plate 30 is supported for movement in three-dimensional space. This is made possible by the parallel guiding mechanism 20, the vertical guideway 28 which permits raising and lowering of the parallel guiding mechanism 20, and the sliding connection between the slide plate 30 and the front plate 24.

Referring again to FIGS. 1 and 2, the slide plate 30 supports a tracing stylus 32 and a first cutter 34. The tracing stylus 32 is rigidly secured to a supporting arm 36 which is pivotally connected to the slide plate 30. The first cutter 34 is rotatably supported in a spindle 38 for rotation about a vertical axis indicated by the dash-dot line 39. The spindle 38 is secured to the slide plate 30 and is movable vertically along the rotational axis 39 of the first cutter 34 to adjust its position relative to the tracing stylus 32. As can be seen, the tracing stylus 32 and the first cutter 34 are supported on the slide plate 30 in a spaced-apart, substantially parallel relationship. Consequently, movement of the tracing stylus 32 along a predetermined path will result in the movement of the cutter 34 along the same predetermined path.

As shown in FIG. 1, a master mold 40 is secured to the clamping table 18 beneath the tracing stylus 32. The master mold 40 comprises one-half of the mold to be reproduced and includes a cavity 42 formed therein in one surface thereof. A mold blank 44 is secured to the clamping table 16 directly beneath the first cutter 34. The mold blank 44 is positioned relative to the master mold 40 whereby the tracing stylus 32 and the first cutter 34 will contact corresponding points on the upper surfaces of the master mold 40 and the mold blank 44, respectively.

Referring again to FIGS. 1 and 2, and in particular to FIG. 2, the die sinking apparatus 10 is provided with a pantograph assembly 46 which includes four arms 48–54. The arms 48, 50 have their adjacent ends pivotally connected. In a similar manner, the arms 52, 54 have their adjacent ends pivotally connected. The arm 52 is pivotally and slideably connected to the arm 54 by means of a slide block 56, the arrangement being such that the end of the arm 52 adjacent to the arm 50 is positionable along the length of the arm 50. The arm 52 has provided thereon a second slide block 58 whose position relative to the arm 52 may be varied. The arm 54 is pivotally and slideably connected to the other end of the arm 48 by means of a third slide block 60, the arrangement being such that the position of the arm 54 with respect to the end of the arm 48 may be varied. A first universal joint 62 serves to connect the pantograph assembly 46 at the juncture of the arms 48, 54, to the column 14. A second universal joint 64 serves to connect the second slide block 58 to the slide plate 30. Consequently, the pantograph assembly 46 serves as a guiding system for the slide plate 30 and also permits displacement of the slide plate 30 in a vertical direction. The pantograph assembly 46 permits, for example, the cavity 42 of the master mold to be reproduced in mold blank 44 at the same scale, on an enlarged scale or at a reduced scale.

At the free end of the arm 50 there is provided a handle 68 which the operator grasps to guide the slide block in accordance with the contours of the cavity 42 formed in the master mold 40. As is conventional, the weight of all moving parts is counterbalanced by a spring (not shown) located in the supporting column 14.

The first cutter 34 is rotated by means of a drive means 70 which comprises an electric motor 72 carried on the supporting column 14, which is connected to the first cutter 34 by means of a pair of sheave and belt assemblies 74, 76 whose adjacent ends are connected by means of a pivotal connection 78. The pivotal connection 78 permits the slide plate 30 to be moved freely along a predetermined path while the first cutter 74 is rotated.

In accordance with the present invention, there is provided a detachable spindle supporting assembly 80 comprising, in general, a bracket 82 one of which is detachably secured to the front face of the slide plate 30 and which has a carrier 84 releasably secured to its outboard end. Clamped within the carrier 84 is a second spindle 86 which supports a second cutter 88 for rotation about a vertical axis 90. The vertical axes 39, 90 of the first and second cutters 34, 88 preferably are parallel and reside in a common vertical plane which is substantially perpendicular to the plane of movement of the slide plate 30. A sheave and pulley assembly 92 serves to connect the second cutter 88 to the drive means 70. Hence, the first and second cutters 34, 88 are rotated simultaneously. As can be seen in FIG. 1, a second mold blank 94 is secured to the clamping table 16 in a predetermined position with respect to the first mold blank 44. That is to say, corresponding points on the mold blanks 44, 94 are spaced apart by a distance equal to the spacing between the vertical axes of the first and second cutters 34, 88.

Figure 3:
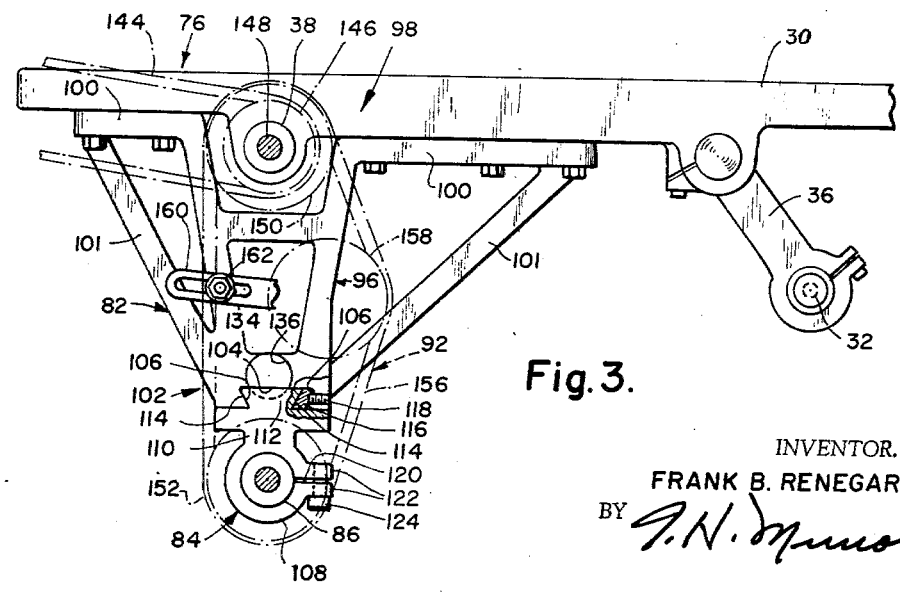
FIG. 3 is a fragmentary plan view of the slide plate and the present spindle supporting assembly.

Reference is now directed to FIGS. 3–5 for a detailed description of the detachable spindle supporting assembly 80 of the present invention.

As can best be seen in FIG. 3, the bracket 82 includes a central body portion 96 having an inboard end 98 which is provided with oppositely extending lateral flanges 100. The central body portion 96 also includes an outboard end 102 in which is formed a vertically extending groove 104 having a pair of opposed, undercut, inner side walls 106. Reinforcing ribs 101 extend between the flanges 100 and the outboard end 102.

The carrier 84 includes an elongated hollow tubular outboard portion 108 having a rearwardly extending T-shaped portion 110. Projecting from the inboard face of the T-shaped portion 110 is a vertically extending rib 112 formed with a pair of opposed, undercut, outer side walls 114. The rib 112 is disposed within the vertically extending groove 104 with one of its undercut, outer side walls 114 engaged with one of the undercut, inner side walls 106. A gib plate 116 is inserted between the other of undercut, outer side walls 114 and the undercut, inner side walls 106. A plurality of set screws 118 bear against the gib plate 116 to clamp the carrier 84 to the outboard end 102 of the bracket 82. At one location in the wall of the tubular outboard portion 108 there is provided a cut 120 which extends longitudinally therethrough. Extending laterally from the tubular outboard portion 108 on either side of the cut 120 are clamping flanges 122 through which extends a plurality of machine screws 124. When the second spindle 86 is introduced into the tubular outboard portion 108, it is initially positioned relative to the clamping table 16 (FIG. 1) and thereafter clamped in place by means of the machine screws 124.

The present spindle supporting assembly 80 also is provided with an adjustment means 126, best illustrated in FIG. 5, for making critical adjustments of the position of the second cutter 88 with respect to the first cutter 34. As can be seen in FIG. 5, the adjustment means 126 comprises a bolt 128 having a radial flange 130 extending transversely of the bolt 128 and disposed at one end thereof. The bolt 128 is threadedly engaged in a threaded bore 132 provided in a web portion 134 of the board end 102. Above the threaded bore 132 there is provided an enlarged bore 136 adapted to receive the radial flange 130 of the bolt 128. As can be seen, the bolt 128 may be elevated or lowered in a vertical direction by rotation of the bolt 128 in the appropriate direction.

The rib 112 of the carrier 84 is provided with an arcuate slot 138 which is adapted to receive a portion of the radial flange 130. The upper and lower faces of the radial flange 130 preferably are chrome plated so as to provide for free sliding movement relative to the upper and lower surfaces of the arcuate slot 138. Final adjustments of the second cutter 88 with respect to the first cutter 34 may be made by loosening the set screws 118 and by turning the bolt 128 in one direction whereby the carrier 84 is lowered or by turning the bolt 128 in the opposite direction whereby the carrier 84 is raised. After the second cutter 88 has been finally positioned, the set screws 118 are tightened to clamp the carrier 84 in the finally adjusted position.

As stated above, the present spindle supporting assembly 80 is detachable from the slide plate 30. Accordingly, the laterally extending flanges 100 preferably are secured to the slide plate 30 by means of a plurality of bolts 140 which extend through clearance holes provided in the flanges 100 and are threadedly engaged in threaded openings provided in the slide plate 30. Dowel pins 142 are provided which extend through each of the lateral flanges 100 into corresponding openings provided in the slide plate 30. The dowel pins 142 serve to align the spindle supporting assembly 80 with respect to the first spindle 38.

As described above, the first pulley 38 is driven by means of a pair of pivotally connected sheave and belt assemblies 74, 76, the sheave and belt assembly 76 being illustrated, in part, in dotted outline in FIG. 3 and in full lines in FIGS. 4 and 5. The sheave and belt assembly 76 includes, in part, a drive belt 144 which drives a pulley 146. The pulley 146 is rigidly secured to a shaft 148 rotatably supported in the first spindle 38. The sheave and pulley assembly 92 is connected with the pulley 146 and is employed for rotating the second cutter 88. The sheave and pulley assembly 92 comprises a first pulley 150 rigidly secured to the shaft 148 associated with the first spindle 38; a second pulley 152 which is rigidly secured to a shaft 154 rotatably supported in the second spindle 86; and a drive belt 156 engaged with the first and second pulleys 150, 152. A third pulley 158 is engaged with the drive belt 156 for the purpose of maintaining proper tension in the drive belt 156. The third pulley 158 is carried on a slotted bracket 160 which is releasably secured to the central body portion 96 by means of bolts 162.

As can best be seen in FIG. 5, the first pulley 150 has a diameter which is larger than the diameter of the drive pulley 146 of the sheave and belt assembly 76. Consequently, the rotational speed of the second cutter 88 will be greater than the rotational speed of the first cutter 34. Hence, the chatter normally associated with a pair of spaced-apart cutters which are driven at the same rotational speed, is eliminated.

OPERATION

The conventional die sinking apparatus 10 illustrated in FIG. 1, now, may be operated to machine two mold halves simultaneously. This is made possible through the use of the spindle supporting assembly 80 of the present invention.

To setup the die sinking apparatus 10, the master mold 40 is oriented with respect to the tracing stylus 32 and then secured to the clamping table 18. Thereafter, the mold blank 44 is placed on the clamping table 16 and oriented with respect to the master mold 40 and the first cutter 34. The mold blank 44 is then clamped to the clamping table 16. The mold blank 94 then is secured to the clamping table 16. The positioning of the mold blank 94 is considerably simplified in that it is positioned with respect to the mold blank 44 rather than being positioned with respect to a cutter. The mold blank 94 is aligned with the mold blank 44 and spaced therefrom by a distance equal to the distance between the vertical axes 39, 90 of the first and second cutters 34, 88.

In FIG. 5, the mold blanks 44, 94 are illustrated disposed in opposition with the first and second cutters 34, 88. The mold blanks 44, 94 are positioned so that their centerlines 164, 166, respectively, are parallel and spaced apart by the distance separating the first and second cutters 34, 88. Hence, the cutters 34, 88 will machine a cavity half in each of the mold blanks 44, 94 which cavity halves are symmetrical about the centerlines 164, 166. Upon the completion of the machining operation, the mold blanks 44, 94 may be clamped together to form a complete mold. Since, the cavity halves are symmetrical about the centerlines 164, 166, the complete cavity will have a surface which is continuous in the region of abutment between the two mold blanks 44, 94.

Although the invention has been illustrated in connection with one specific embodiment, it will be readily apparent to those skilled in the art that various changes in form and arrangement of parts may be made to suit requirements without departing from the spirit and scope of the invention.

I claim as my invention:

1. In die sinking apparatus for machining the contours of a master mold in the surface of workpieces, having a horizontal slide plate supported for movement in three-dimensional space, a clamping table disposed below said slide plate and positionably relative thereto, a rotatable cutter supported on said slide plate and extending toward said clamping table, said rotatable cutter being adapted to machine a workpiece supported on said clamping table, means supporting said slide plate for movement in three-dimensional space in accordance with the contours of a master mold, and drive means for rotating said rotatable cutter, the improvement comprising: a bracket member secured to said slide plate and movable therewith, said bracket extending normally from said slide plate and over said clamping table; a carrier member releasably secured to the outboard end of said bracket and extending substantially perpendicular to said clamping table; a spindle secured to said carrier; a second cutter rotatably supported on said spindle for rotation about an axis which is parallel to the rotational axis of the first said cutter, said second cutter being adapted to machine a second workpiece supported on said clamping table; and means connecting said second cutter with said drive means for rotating the same; the workpieces being positioned relative to one another so that the first said cutter and said second cutter will contact corresponding points thereon; the first said cutter and said second cutter being movable in unison.

2. The improvement of claim 1 including adjustment means operable on said carrier for varying the height of said second cutter above said clamping table.

3. The improvement of claim 1 wherein said second cutter is driven at a rotational speed which is greater than the rotational speed of the first said cutter.

4. The improvement of claim 1 wherein said means for rotating said second cutter comprises a first sheave rotatable with said second cutter, a second sheave rotatable by said drive means and a drive belt engaged with both said first and second sheaves, one of said sheaves having a rim speed which is greater than the rim speed of the first said cutter whereby rotational speed of said second cutter is greater than the rotational speed of the first said cutter.

5. A detachable spindle holder comprising a bracket member having a central body portion with oppositely extending lateral flanges at one end thereof, said flanges having openings adapted to receive bolts for detachably securing said bracket to a supporting member; an elongated carrier member, means for releasably clamping said elongated carrier member to that end of said central body portion opposite said flanges; guide means for guiding the movement of said elongated carrier member during adjustments in the position of said elongated carrier member with respect to said bracket; adjustment means operable upon the release of said elongated carrier member for moving said carried member; a spindle extending through said elongated carrier member and secured thereto; and a cutter rotatably supported at one end of said elongated carrier member.

6. The improvement of claim 5 wherein said adjustment means comprises a bolt threadedly engaged in one of said members for movement parallel with said carrier member, a radial flange integral with said bolt, said radial flange being engaged in an arcuate slot formed in the other of said members whereby clockwise rotation of said bolt causes movement of said carrier member in one direction and counterclockwise rotation of said bolt causes movement of said carrier member in the opposite direction.

References Cited by the Examiner

UNITED STATES PATENTS

| 1,219,310 | 3/1917 | Hope | 90—13.1 |
| 1,669,905 | 5/1928 | Keller | 90—13.1 |
| 2,208,430 | 7/1940 | Ostler | 90—13.1 |
| 2,371,941 | 3/1945 | Zwick | 90—13.1 |
| 2,858,743 | 11/1958 | Sallivey | 33—?? |

ROBERT B. HULL, *Primary Examiner.*